United States Patent
Kawamura et al.

(10) Patent No.: US 8,630,034 B2
(45) Date of Patent: Jan. 14, 2014

(54) DISPLAY MEDIUM AND DISPLAY DEVICE

(75) Inventors: Akihide Kawamura, Kanagawa (JP);
Hideo Kobayashi, Kanagawa (JP);
Masaaki Araki, Kanagawa (JP);
Takehito Hikichi, Kanagawa (JP);
Mamoru Fujita, Kanagawa (JP);
Motohiko Sakamaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/554,634

(22) Filed: Jul. 20, 2012

(65) Prior Publication Data

US 2013/0242374 A1    Sep. 19, 2013

(30) Foreign Application Priority Data

Mar. 16, 2012   (JP) .................................. 2012-061121

(51) Int. Cl.
*G02B 26/00*   (2006.01)
(52) U.S. Cl.
USPC ......................................................... 359/296
(58) Field of Classification Search
CPC ....... G03G 5/00; G03G 5/0696; G03G 17/04; G02F 1/167
USPC ........ 252/500; 345/107; 359/296; 430/32, 38
See application file for complete search history.

(56) References Cited

U.S. PATENT DOCUMENTS

| | | | |
|---|---|---|---|
| 6,621,210 B2 * | 9/2003 | Kato et al. | 313/496 |
| 7,110,076 B2 * | 9/2006 | Shimizu et al. | 349/141 |
| 2006/0103789 A1 | 5/2006 | Takahashi et al. | |

FOREIGN PATENT DOCUMENTS

| | | |
|---|---|---|
| JP | A-4-237027 | 8/1992 |
| JP | A-2006-145602 | 6/2006 |

* cited by examiner

*Primary Examiner* — David N Spector
(74) *Attorney, Agent, or Firm* — Oliff & Berridge, PLC

(57) ABSTRACT

A display medium of the present invention includes first and second substrates, a spacing member and a particle dispersion liquid. The first substrate is transparent to light. The second substrate is opposite to the first substrate and has plural electrodes placed at an interval. The second substrate has a difference between reflectivity of the electrode portions and reflectivity of plural boundary portions between the electrodes with respect to light incident from the first substrate side. The difference is 12 percentage points or less. The spacing member is placed between the first and second substrates at another interval, is transparent to light, and keeps a gap between the first and second substrates. The particle dispersion liquid is filled between the first and second substrates, and includes particles moving in a direction of an electric field formed between the first and second substrates and a dispersion medium.

11 Claims, 9 Drawing Sheets

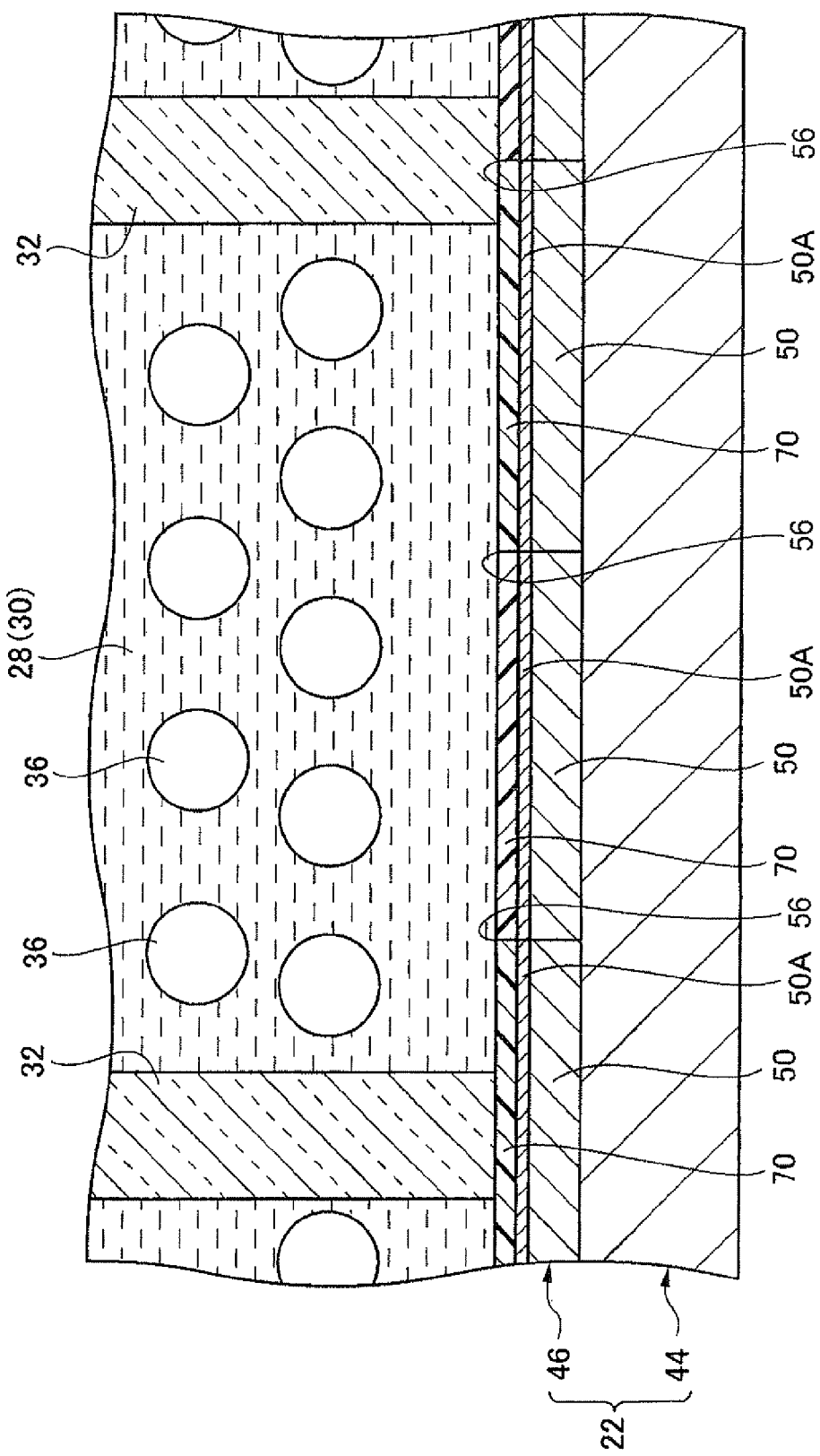

DISPLAY MEDIUM AND DISPLAY DEVICE

CROSS-REFERENCE TO RELATED APPLICATION

This application is based on and claims priority under 35 USC119 from Japanese Patent Application No. 2012-061121 filed on Mar. 16, 2012.

BACKGROUND

Technical Field

The present invention relates to a display medium and a display device.

SUMMARY (1) According to an aspect of the invention, a display medium of the present invention includes a first substrate, a second substrate, a spacing member and a particle dispersion liquid. The first substrate is transparent to light. The second substrate (i) is provided to be opposite to the first substrate, (ii) has plural electrode portions and plural boundary portions placed at a predetermined interval, and (iii) indicates a relationship satisfying the following equation; $|R1-R2| \leq 12$ percentage points. R1 presents reflectivity of the electrode portions and R2 presents reflectivity of the boundary portions. A boundary portion is between electrode portions. The spacing member (iv) is placed between the first substrate and the second substrate at another interval different from the predetermined interval of the electrodes, (v) is transparent to light, and (vi) keeps a gap between the first and second substrates. The particle dispersion liquid is filled between the first and second substrates and includes a dispersion medium and particles which moves by an electric field formed between the first and second substrates.

(2) The display medium of (1), the second substrate has a difference between the reflectivity of the electrode portions and the reflectivity of the boundary portions with respect to light incident from the first substrate side. The difference is evenly throughout the electrode portions and the boundary portions.

(3) The display medium of (2), the second substrate has a coat layer so as to set the difference to be 12 percentage points or less.

(4) The display medium of (3), the coat layer is black.

(5) The display medium of (1), an electrode surface of each electrode portion facing the first substrate side has a coat layer made of an anodized aluminum alloy.

(6) According to another aspect of the invention, a display medium includes a first substrate, a second substrate, a spacing member and a particle dispersion liquid. The first substrate is transparent to light. The second substrate (i) is provided to be opposite to the first substrate, (ii) includes plural electrode portions and plural boundary portions placed at a predetermined interval. A boundary portion is between electrode portions. Surface treatment is performed on the first substrate side in the second substrate. The surface treatment decreases a difference between reflectivity of the electrode portions and reflectivity of the boundary portions with respect to light incident from the first substrate side. The spacing member (iii) is placed between the first substrate and the second substrate at another interval different from the predetermined interval of the electrodes, (iv) is transparent to light, and (v) keeps a gap between the first and second substrates. The particle dispersion liquid is filled between the first and second substrates, and includes particles which moves by an electric field formed between the first and second substrates and a dispersion medium.

(7) The display medium of (6), the surface treatment is performed evenly throughout the electrode portions and the boundary portions (8). The display medium of (7), the surface treatment is coating.

(9) The display medium of (8), the coating is black.

(10) The display medium of (6), an electrode surface of each electrode portion facing the first substrate side has a coat layer made of an anodized aluminum alloy.

(11) According to further another aspect of the invention, a display device includes the display medium of any one of claims 1 to 10 and a field forming unit. The field forming unit forms an electric field between substrates by applying voltage between the substrates provided in the display medium.

BRIEF DESCRIPTION OF THE DRAWINGS

Exemplary embodiments of the invention will be described in detail based on the following figures, wherein:

FIG. 9 is an enlarged cross-sectional view illustrating the display medium according to the second exemplary embodiment.

DETAILED DESCRIPTION

A display medium of the present invention includes a first substrate, a second substrate, a spacing member and a particle dispersion liquid. The first substrate is transparent to light. The second substrate is provided to be opposite to the first substrate and has plural electrode portions and plural boundary portions placed at a predetermined interval. The second substrate has a difference between reflectivity of the electrode portions and reflectivity of the boundary portions between the electrode portions with respect to light incident from the first substrate side. The difference is 12 percentage points or less. The spacing member is placed between the first substrate and the second substrate at another interval different from the predetermined interval of the electrodes and is transparent to light. The spacing member keeps a gap between the first and second substrates. The particle dispersion liquid is filled between the first and second substrates. The particle dispersion liquid includes migratory particles which moves in a direction of an electric field formed between the first and second substrates and a dispersion medium which disperses the migratory particles. In the second substrate, the difference between the reflectivity of the electrode portions and the reflectivity of the boundary portions between the electrode portions with respect to the light incident from the first substrate side is more preferably 5 percentage points or less and still more preferably, 3.5 percentage points or less.

In this invention, reflectivity indicates a ratio to the light incident from the first substrate side when is the light incident from the first substrate side indicates 100 percent.

A case in which the difference between the reflectivity of the electrode portions and the reflectivity of the boundary portions between the electrode portions with respect to the light incident from the first substrate side is 12 percentage points or less indicates a relationship satisfying the following equation when the reflectivity of the electrode portions is set as $R_1$ percent and the reflectivity of the boundary portions is set as $R_2$ percent.

$$|R_1-R_2|\leq 12 \text{ percentage points.}$$

Hereinafter, detailed exemplary embodiments will be described.

<First Exemplary Embodiment>

Examples of a display medium and a display device according to a first exemplary embodiment of the present invention will be described with reference to FIGS. 1 to 7.

(Display Device)

First, a configuration of a display device 10 will be described. The display device 10 is used as, for example, a device capable of storing and rewriting an image (specifically, a bulletin board, a notification board, an electronic blackboard, an advertisement, a signboard, a blinking sign, an electronic paper, an electronic newspaper, an electronic book and a document sheet which can be shared with a copy machine and a printer).

Figure 3:
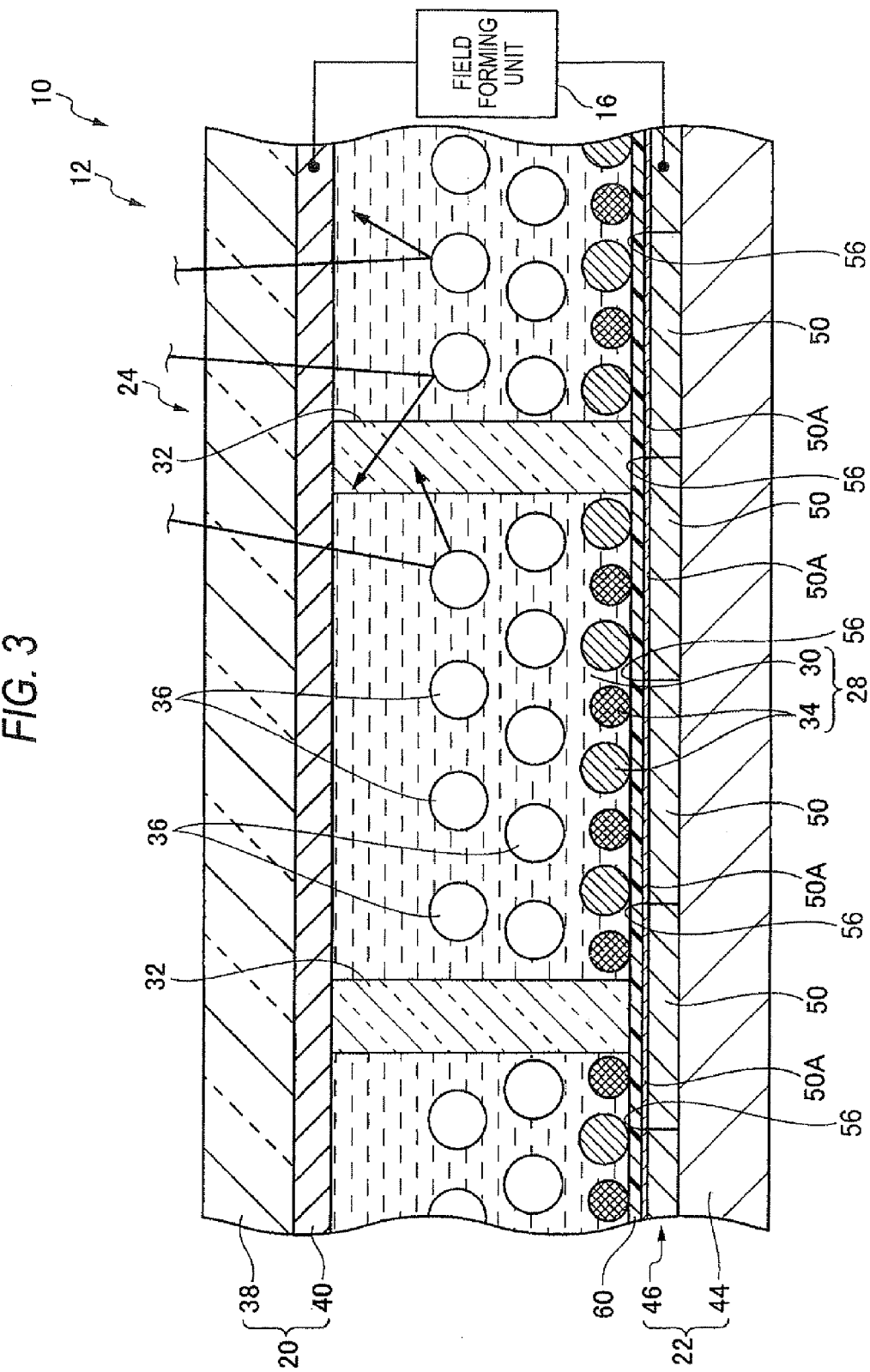
FIG. 3 is a cross-sectional view illustrating the display medium and a display device according to the first exemplary embodiment.
Figure 4:
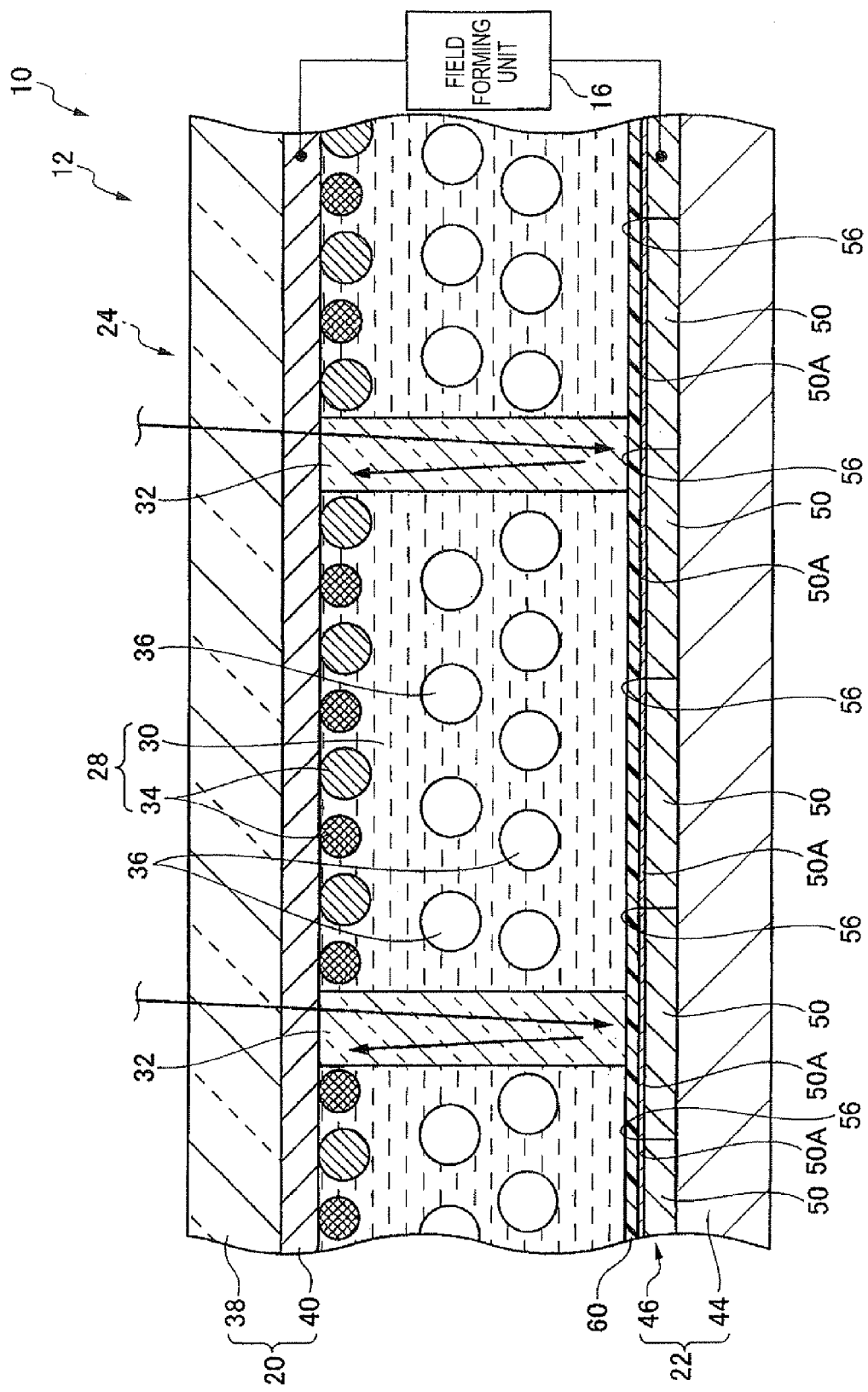
FIG. 4 is a cross-sectional view illustrating the display medium and the display device according to the first exemplary embodiment.

As illustrated in FIGS. 3 and 4, the display device 10 electrophoretically displays an image, and includes a display medium 12 used to display the image and a field forming unit 16 applying voltage to the display medium 12 and forming an electric field in the display medium 12.

The field forming unit 16 is electrically connected to a surface electrode 40 and a back electrode 46 to be described below, which are provided in the display medium 12. Voltage is applied between the surface electrode 40 and the back electrode 46 by the field forming unit 16, such that the electric field is formed between the surface electrode 40 (a surface substrate 20) and the back electrode 46 (a back substrate 22).

(Display Medium)

Figure 7:
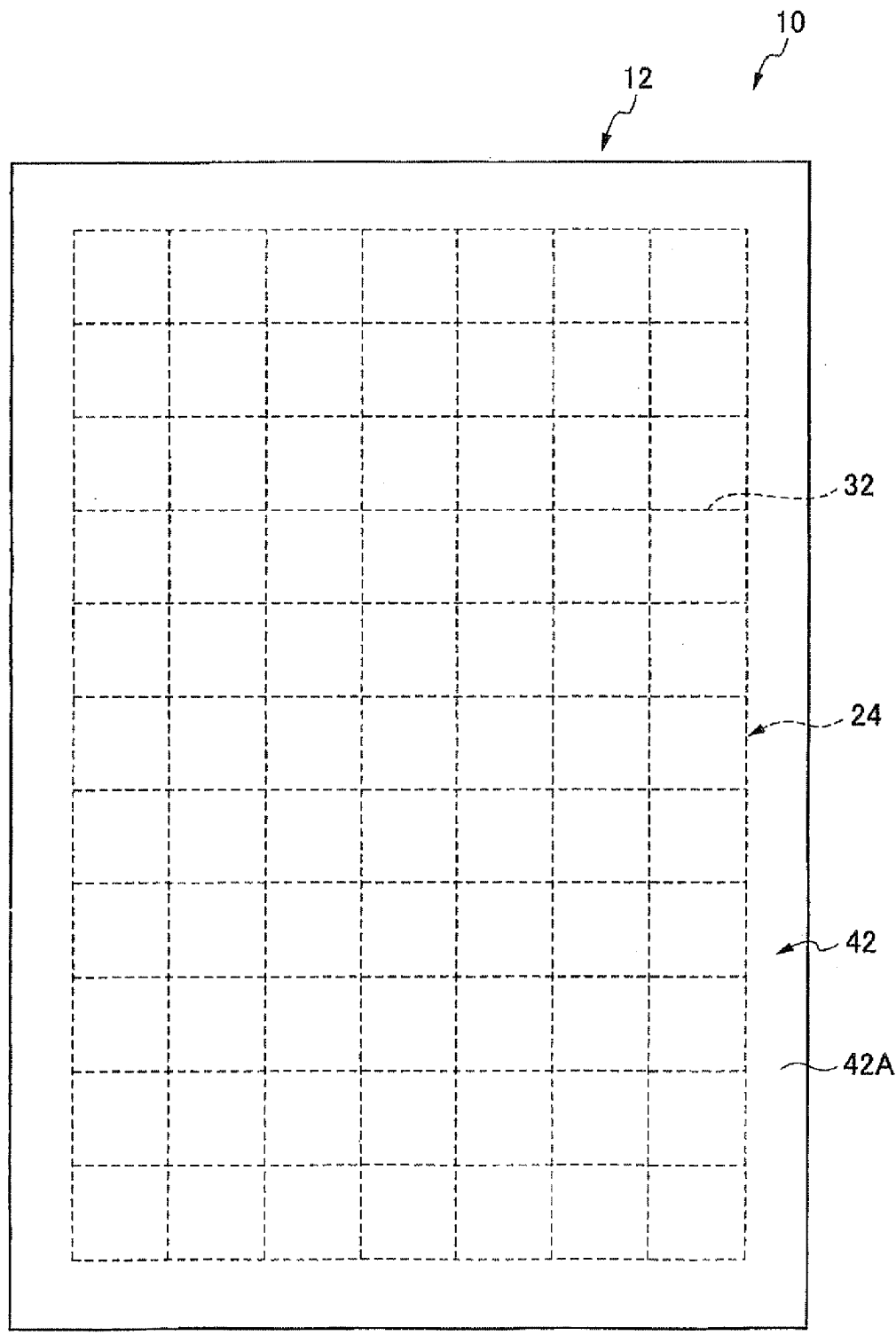
FIG. 7 is a plan view illustrating the display medium according to the first exemplary embodiment.

As illustrated in FIG. 7, the display medium 12 includes a display unit 24 displaying the image and a bonding unit 42 bonding the surface substrate 20 as an example of a first substrate and the back substrate 22 as an example of a second substrate (see, e.g., FIGS. 3 and 4), which will be described below.

[Bonding Unit]

The bonding unit 42 is placed to surround the outer periphery of the display unit 24 and is formed by a bonding member 42A bonding the surface substrate 20 and the back substrate 22.

[Display Unit]

[Surface Substrate and Back Substrate]

Figure 6:
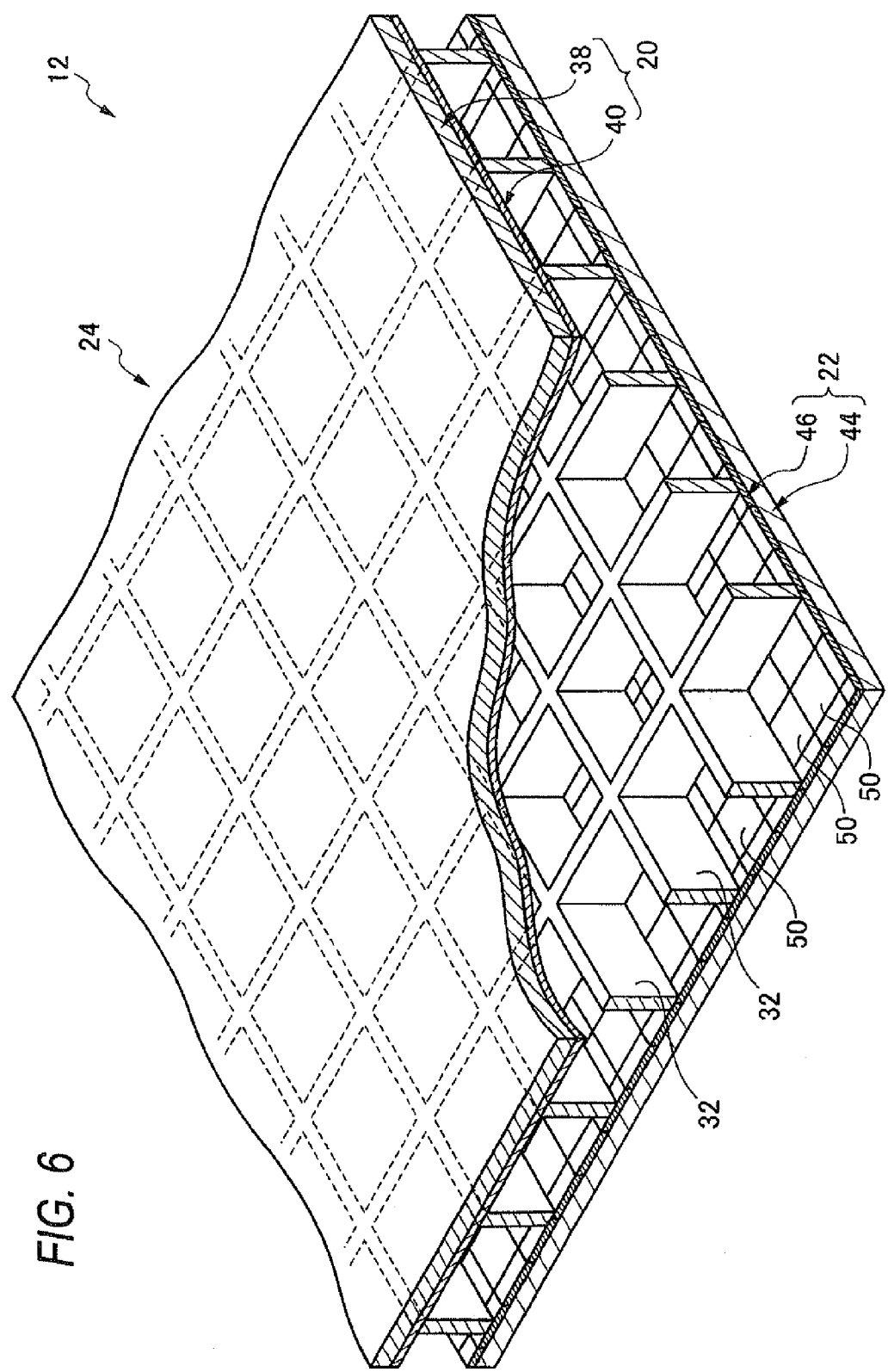
FIG. 6 is a perspective view illustrating the display medium according to the first exemplary embodiment.

FIGS. 3 and 4 illustrate a cross section of the display unit 24 and FIG. 6 illustrates a perspective view of the display unit 24 of which a coating 60 to be described below is not illustrated.

As illustrated in FIGS. 3, 4, and 6, the display unit 24 includes the surface substrate 20 serving as an image displayed surface and the back substrate 22 placed to be opposite to the surface substrate 20 which is separated with a gap.

The surface substrate 20 includes a support substrate 38 and the surface electrode 40 placed on the back substrate 22 side of the support substrate 38. Meanwhile, the back substrate 22 includes a support substrate 44 and the back electrode 46 placed on the surface substrate 20 side of the support substrate 44.

As transmission (light transmission) of at least the surface substrate 20 of the surface substrate 20 and the back substrate 22, transmittance is 60 percent or more.

As for the support substrates 38 and 44, for example, glass, plastic, a polyethylene terephthalate resin, a polyethylene naphthalate resin, a polycarbonate resin, an acrylic resin, a polyimide resin, a polyester resin, an epoxy resin, a polyether sulfone resin and the like are used.

Materials of the surface electrode 40 include, for example, oxides such as indium oxide, tin oxide, cadmium oxide antimony oxide and the like, complex oxides such as ITO and the like, metals such as gold, silver, copper, nickel and the like and organic materials such as polypyrrole, polythiophene or the like. These materials are used as, for example, a single layer film, a mixed film or a complex film. These materials are formed by, for example, a deposition method, a sputtering method, a coating method, a chemical vapor deposition (CVD) method and the like.

As for the back electrode 46, for example, plural electrodes having a single layer or multilayer structure are used, like a driving circuit such as a transistor (thin film transistor (TFT) and the like) and a diode.

A configuration of the back substrate 22 will be described in detail below.

[Spacing Member]

A spacing member 32 that partitions a space between the surface substrate 20 and the back substrate 22 into plural portions and keeps a gap between the substrates is combined in a lattice pattern between the substrates. Regular intervals between lattices are formed.

A cross section of the spacing member 32 cut perpendicularly to the surface of the surface substrate 20 has a rectangular shape. One end (the upper end of the figure) of the spacing member 32 contacts the surface electrode 40 and the other end (the lower end of the figure) of the spacing member 32 contacts the coating 60 to be described below. The spacing member 32 may be colorless and transparent so as not to have a bad influence on a display image displayed in the display medium 12, and as transmission of the spacing member 32, transmittance is 50 percent or more.

An area (hereinafter, referred to as a cell) partitioned by the spacing member 32 is surrounded by the surface substrate 20, the back substrate 22 and the spacing member 32.

The height (a distance between the electrodes) of the spacing member 32 is in the range of 10 μm to 200 μm (preferably, 50 μm) in consideration of image quality of the display image and a switching speed of the image. A lattice interval of the spacing member 32 is in the range of 200 μm to 500 μm in consideration of preventing deterioration of an aperture ratio or preventing biasing by sedimentation of migration particles.

As the spacing member 32, a thermoplastic resin, a thermosetting resin, an electron beam curable resin, a photocurable resin, rubber, metal and the like are used.

As for a forming method of the spacing member 32, a forming method is used which includes forming a layer made of a photocurable resin (for example, the thermoplastic resin, the acrylic resin, acrylate, urethane and the like) having an adhesion property on one of the surface substrate 20 and the back substrate 22, and then forming a latent image on the layer of the corresponding resin by exposing the formed layer by a photolithography method and developing the latent image. The spacing member 32 may be formed by embossing a resin by thermal nano imprint, optical nano imprint or nano imprint as a combination thereof. The spacing member 32 may be formed using other known methods.

[Migratory Particle, Dispersion Medium and Reflection Particle]

As illustrated in FIGS. 3 and 4, particle dispersion liquid 28 containing migratory particles 34 moving by the electric field and a dispersion medium 30 in which the migratory particles 34 are dispersed, is filled in each cell. Particle dispersion liquid 28 may further containing reflection particles 36 having an optical reflection characteristic are dispersed in the dispersion medium 30, is filled in each cell.

An insulating liquid may be used as the dispersion medium 30. Herein, the "insulating" indicates that a volume resistance value is $10^7$ Ω·cm or more.

Specifically, as the insulating liquid, for example, hexane, cyclohexane, toluene, xylene, decane, hexadecane, kerosene, paraffin, iso-paraffin, silicone oil, modified silicone oil, dichloroethylene, trichloroethylene, perchloroethylene, pure petroleum, ethylene glycol, alcohols, ethers, esters, dimethyl formamide, dimethyl acetamide, dimethyl sulfoxide, N-methylpyrrolidone, 2-pyrrolidone, N-methylformamide, acetonitrile, tetrahydrofuran, propylene carbonate, ethylene carbonate, benzine, diisopropylnaphthalene, olive oil, isopropanol, trichlorotrifluoroethane, tetrachloroethane, dibromotetrafluoroethane and the like or mixtures thereof are appropriately used.

Water (so called, deionized water) without impurities may be used as the dispersion medium 30 to have a volume resistance value described below. The volume resistance value is preferably $10^7$ Ω·cm or more, more preferably in the range of $10^7$ Ω·cm to $10^{19}$ Ω·cm and still more preferably in the range of $10^{10}$ Ω·cm to $10^{19}$ Ω·cm. By setting the volume resistance in the ranges, the electric field is more effectively applied to the particle dispersion liquid 28 and bubbles are prevented from being generated by electrolysis of the dispersion medium 30 caused by an electrode reaction.

Acid, alkali, salt, a dispersion stabilizer, a stabilizer for antioxidation or ultraviolet absorption, an antibacterial agent, a preservative and the like may be added to the insulating liquid, but preferably added so that the volume resistance value is in the ranges as described above.

As for an electrification control agent, an anion surfactant, a cationic surfactant, an ampholytic surfactant, a non-ionic surfactant, a fluorinated surfactant, a silicone surfactant, a metallic soap, alkylphosphate esters, succinimides and the like may be added to the insulating liquid.

A polymer resin may be used as the dispersion medium 30. The polymer resin may be a polymer gel, a high-molecular polymer and the like. Specifically, as the polymer resin, for example, gelatin, polyvinyl alcohol, poly(meta)acrylamide and the like are used. The polymer resins may be used as the dispersion medium 30 like the insulating liquid as described above.

The migratory particles 34 move between the surface substrate 20 and the back substrate 22 in the direction of the electric field formed in the cell.

As the migratory particles 34, insulating metallic oxide particles such as glass beads, alumina, titanium oxide and the like, thermoplastic or thermosetting resin particles, particles generated by fixing a colorant onto the surface of the resin particles, particles in which an insulating colorant is contained in the thermoplastic or thermosetting resin, and metallic colloid particles having a Plasmon color producing function are used.

An electrification control agent controlling an electrification property may be mixed within the resin constituting the migratory particles 34 as necessary. A magnetic material may be mixed with an inner part or the surface of the migratory particles 34 as necessary. An external additive may be attached to the surface of the migratory particles 34 as necessary.

The reflection particles 36 filled in each cell are placed at the center between the surface substrate 20 and the back substrate 22 regardless of the direction of the electric field between the substrates, between the surface substrate 20 and the back substrate 22, and provided throughout the entire surface of the surface substrate 20 in the surface direction.

The reflection particles 36 have an optical reflection characteristic different from the migratory particles 34 and scatter incident light.

Herein, the "reflection particles 36 have an optical reflection characteristic different from the migratory particles 34" indicates that there is a difference enough to identify a difference therebetween in chromaticity, luminosity and chroma, when the dispersion medium 30 in which only the migratory particles 34 are dispersed is observed with eyes in comparison with the reflection particles 36. In particular, the chromaticity may be different among the chromaticity, luminosity, and chroma thereof.

The "difference enough to identify" indicates that in detail, a difference between a* and b* is 5 or more at the time of measuring respective CIELAB values in the dispersion medium 30 in which only the migratory particles 34 are dispersed and the reflection particles 36 by using X-Rite404 manufactured by X-Rite Incorporated, for example, when the chroma is different.

According to a configuration of the display unit 24 in the present exemplary embodiment, when voltage is applied to the surface electrode 40 and the back electrode 46 of the display medium 12 from the field forming unit 16, the electric field depending on the applied voltage is formed in the dispersion medium 30. The migratory particles 34 move between the surface substrate 20 and the back substrate 22 by the formed electric field.

For example, when the migratory particles 34 are charged to a negative electrode, positive voltage is applied to the surface electrode 40, and negative voltage is applied to the back electrode 46, the migratory particles 34 move from the back substrate 22 side to the surface substrate 20 side through gaps of the reflection particles 36 (see, e.g., FIG. 4). In this case, when the display medium 12 is observed from the surface substrate 20 side with the eyes, a color of the migratory particles 34 positioned on the surface substrate 20 side is viewed as a color of the display medium 12 (for example, black in the present exemplary embodiment).

Meanwhile, when negative voltage is applied to the surface electrode 40 and positive voltage is applied to the back electrode 46, the migratory particles 34 move from the surface substrate 20 side to the back substrate 22 side through the gaps of the reflection particles 36 (see, e.g., FIG. 3). In this case, when the display medium 12 is observed from the surface substrate 20 side with the eyes, a color of the reflection particles 36 is viewed as the color of the display medium 12 (for example, white in the present exemplary embodiment).

(Configurations of Primary Elements)

Next, the back substrate 22 will be described.

Figure 1:
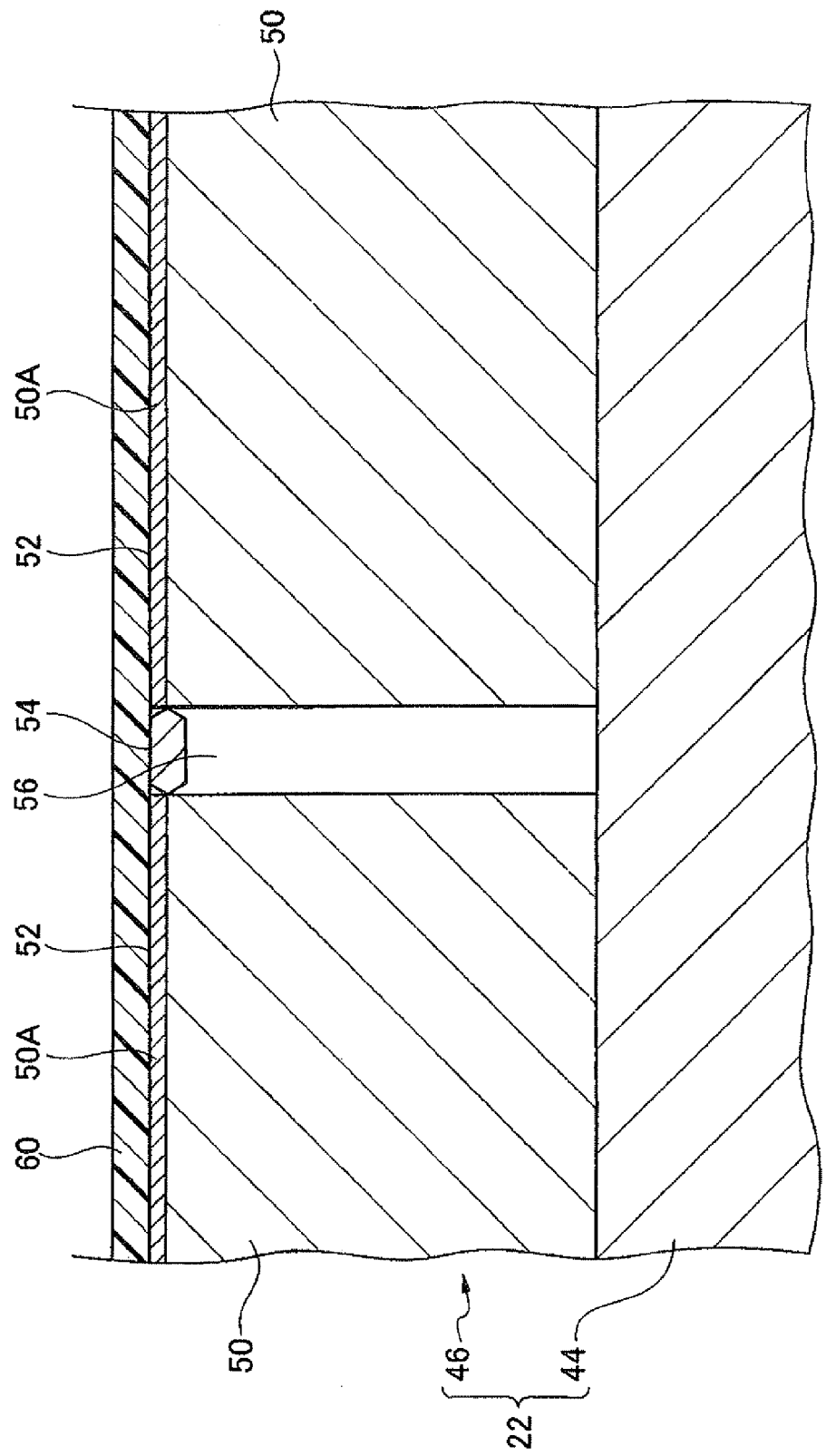
FIG. 1 is a cross-sectional view illustrating a back substrate used in a display medium according to a first exemplary embodiment of the present invention.
Figure 5:
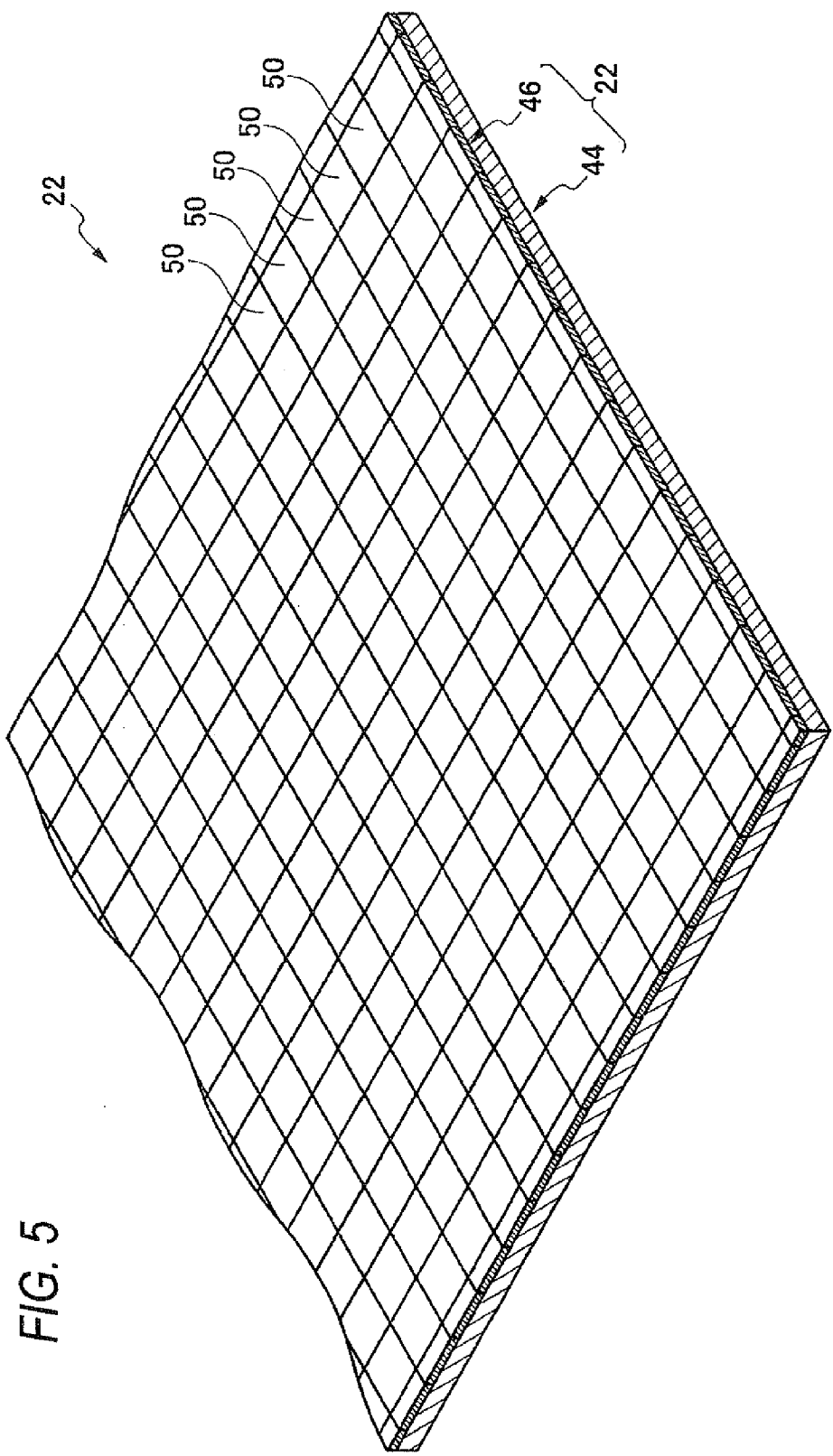
FIG. 5 is a perspective view illustrating the back substrate used in the display medium according to the first exemplary embodiment.

FIG. 5 is a perspective view of the back substrate 22 of which a coating 60 to be described below is not illustrated, and FIG. 1 is an enlarged cross-sectional view of the back electrode 46.

As illustrated in FIG. 5, the back electrode 46 configuring the back substrate 22 has plural individual electrodes 50 as one example of electrodes placed (arranged) longitudinally and laterally at a predetermined interval. Specifically, the individual electrodes 50 have the rectangular shape in planar view when the individual electrodes 50 are viewed in the surface direction of the surface substrate 20 and for example, thin-film transistors (TFTs) of 200 ppi are arranged in parallel at an interval of 127 μm. When the spacing member 32 is set integral multiple of the interval of the individual electrodes 50, a Moire pattern to be described below is not generated, but precise control is difficult by a skew when the substrate is extended and bonded. Both of the spacing member 32 and the individual electrodes 50 are generally placed at different intervals.

As illustrated in FIG. 1, an aluminum film 50A is formed on the surface side (the surface substrate 20 side) of the respective individual electrodes 50 in order to increase an area of a part where the electric field is formed. The aluminum film 50A may be formed on, for example, the surface side of the individual electrodes 50 with aluminum alloy as a material thereof by deposition.

A signal line 54 transferring a signal to each individual electrode 50 is placed between the individual electrode 50 and the individual electrode 50. That is, a boundary portion 56 is formed between the adjacent individual electrodes 50, and the signal line 54 is placed on the boundary portion 56. The respective individual electrodes 50 are insulated from each other with the signal line 54 therebetween. The boundary portion 56 has a smaller size than the individual electrode 50.

The coating 60 for decreasing a difference between reflectivity of the individual electrodes 50 and reflectivity of the boundary portion 56 with respect to light incident from the surface substrate 20 side (see, e.g., FIG. 3) is coated evenly throughout each individual electrode 50 and the boundary portion 56. In the present exemplary embodiment, since an electrode surface 52 of the surface side of the individual electrode 50 has the aluminum film 50A as described above, the reflectivity of the individual electrodes 50 is higher than that of the boundary portion 56.

The coating 60 is black, and for example, carbon black as a pigment coated with polyvinyl alcohol (PVA) is used as a paint. Electric conductivity of the paint is 30 μS/cm or less in consideration of the insulating property between the adjacent individual electrodes 50.

The layer thickness of the coating 60 is in the range of 0.1 μm to 10 μm (preferably 0.3 μm to 1.0 μm, further preferably 0.5 μm) in consideration of field loss of the electric field which is generated between the substrates. An OD value of total light transmittance of the coating 60 is 0.1 or more in order to decrease the difference between the reflectivity of the individual electrodes 50 and the reflectivity of the boundary portion 56.

Additionally, in the present embodiments, reflectivity is measured by a spectro-colorimetric apparatus CM-2022 made by Komica Minolta Holdings, Inc. A following Table 1 shows that existence of Moire when a difference between the reflectivity of the individual electrode and the reflectivity of the boundary portion is changed in a case where a thickness of the coating 60 is changed so as to change the reflectivity of the individual electrode. In a case where there is no coating, the reflectivity of the individual electrode 50 is 42.1 percent and the reflectivity of the boundary portion 56 is 0.00 percent. In this case, the difference between the reflectivity of the individual electrode 50 and the reflectivity of the boundary portion 60 is 42.1 percentage points, which Moire can be seen by a visual confirmation under a natural light environment. In a case where the thickness of the coating 60 is 0.56 μm, the reflectivity of the individual electrode 50 is 2.54 percent and the reflectivity of the boundary portion 56 is 0.00 percent. In this case, the difference between the reflectivity of the individual electrode 50 and the reflectivity of the boundary portion 60 is 2.54 percentage points, which Moire cannot be seen by a visual confirmation under a natural light environment.

TABLE 1

| | Existence of Moire | | | | | | | |
| --- | --- | --- | --- | --- | --- | --- | --- | --- |
| | G1 | G2 | G2 | G2 | G3 | G4 | G4 | G4 |
| Reflectivity of the individual electrode (%) | 42.1 | 10.5 | 7.2 | 5.2 | 4.1 | 3.2 | 2.5 | 0.1 |
| Reflectivity of the boundary portion (%) | 0.0 | 0.0 | 0.0 | 0.0 | 0.0 | 0.0 | 0.0 | 0.0 |

In the Table 1,
G1 indicates that Moire can be seen clearly.
G2 indicates that Moire can be seen when the Moire is looked fixedly.
G3 indicates that Moire cannot be seen very much.
G4 indicates that Moire cannot be seen.

(Operation of Configurations of Primary Elements)

Figure 2:
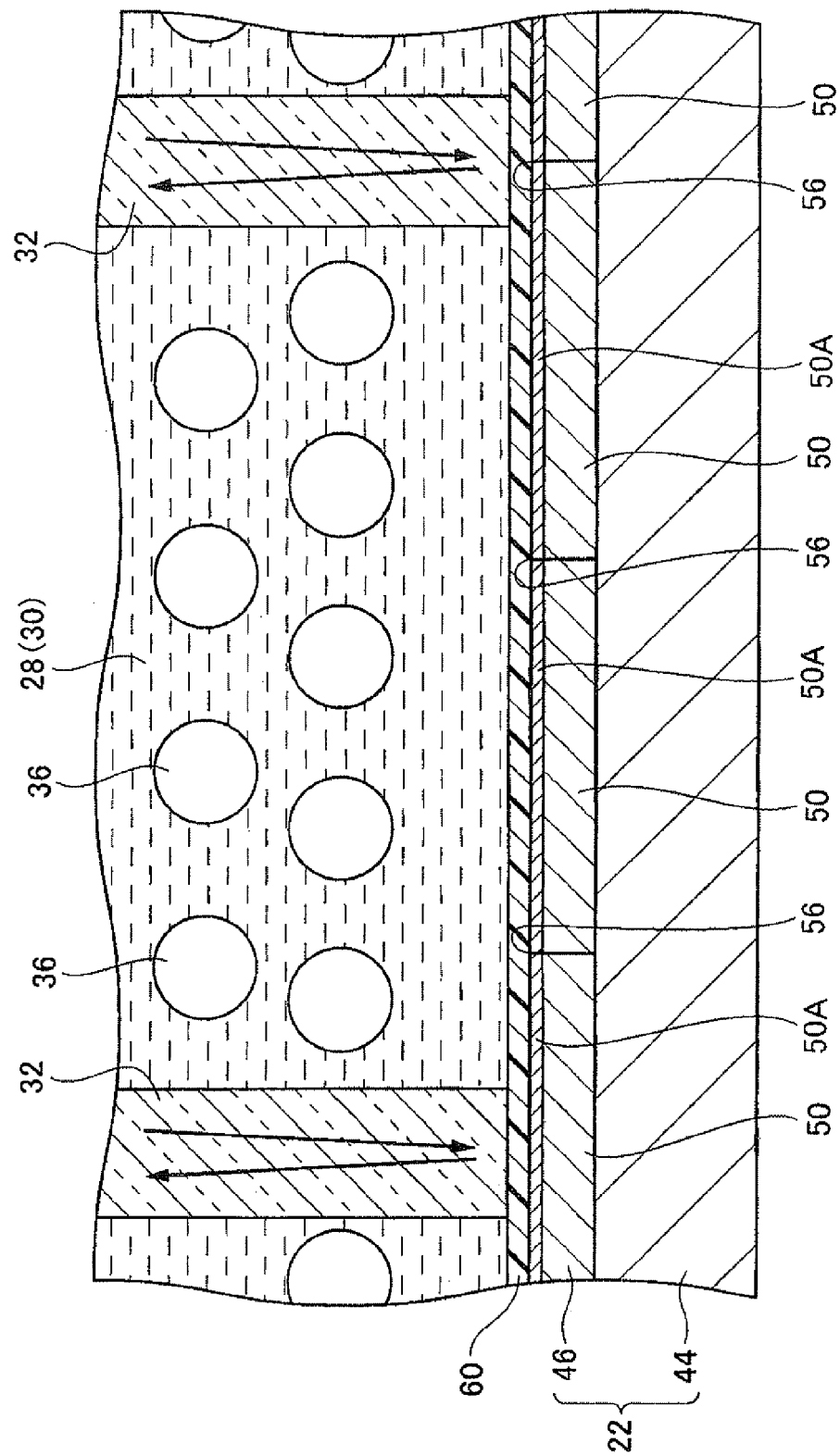
FIG. 2 is an enlarged cross-sectional view illustrating the display medium according to the first exemplary embodiment.

As illustrated in FIGS. 2 and 4, when black is displayed using the display device 10, the migratory particles 34 move from the back substrate 22 side to the surface substrate 20 side through the gaps of the reflection particles 36 by the electric field generated between the substrates, as described above.

Herein, when the spacing member 32 and the individual electrodes 50 are placed at different intervals, the positional relationship between the cross section (the cross section of the back substrate 22 side) of the spacing member 32 and the boundary portion 56 is changed spatially periodically, and a part (a right part illustrated in FIGS. 2 and 4) where the cross section (the cross section of the back substrate 22 side) of the spacing member 32 and the boundary portion 56 are opposed to each other and a part (a left part illustrated in FIGS. 2 and 4) where the cross section of the spacing member 32 and the boundary portion 56 are not opposed to each other, are generated. Therefore, when the coating 60 is not performed, light (see an arrow in the figure, and hereinafter, referred to as noise light) that is incident in the display medium 12 through the surface substrate 20 and the spacing member 32 and reflected toward the surface substrate 20 by the individual electrodes 50 and the boundary portion 56 generates the Moire pattern (interference pattern) and influences coloration by the migratory particles 34, thereby deteriorating a display quality.

In the display medium 12, the coating 60 for decreasing the difference between the reflectivity of the individual electrodes 50 and the reflectivity of the boundary portion 56 is performed throughout each individual electrode 50 and the boundary portion 56. As a result, the occurrence of the Moire pattern (interference pattern) caused by the difference between the reflectivity of the individual electrodes 50 and the reflectivity of the boundary portion 56 is decreased.

When white is displayed using the display device 10, the light incident from the surface substrate 20 side is scattered by colliding with the reflection particles 36 as illustrated in FIG. 3, and as a result, it is difficult that the coloration is influenced by the noise light. Therefore, the problem as in when black is displayed does not occur regardless of the coating 60 (see arrow in the figure).

Since the coating 60 is performed throughout the individual electrode 50 and the boundary portion 56, the difference between the reflectivity of the individual electrodes 50 and the reflectivity of the boundary portion 56 is easily decreased as compared with a case in which the coating 60 is partially performed.

By adopting the coating, the coating 60 is performed with respect to the individual electrode 50 and the boundary portion 56 using a simple facility as compared with for example, a case in which chemical conversion processing is adopted.

As described above, since the coating 60 is black, occurrence of the noise light itself is decreased as compared with the white coating. Therefore, at displaying black, the increase of the reflectivity caused by the noise light is decreased and the display quality is further improved.

<Second Exemplary Embodiment>

Next, examples of a display medium and a display device according to a second exemplary embodiment of the present invention will be described with reference to FIGS. 8 and 9. The same reference numerals refer to the same elements as the first exemplary embodiment and the description thereof will be omitted.

Figure 8:
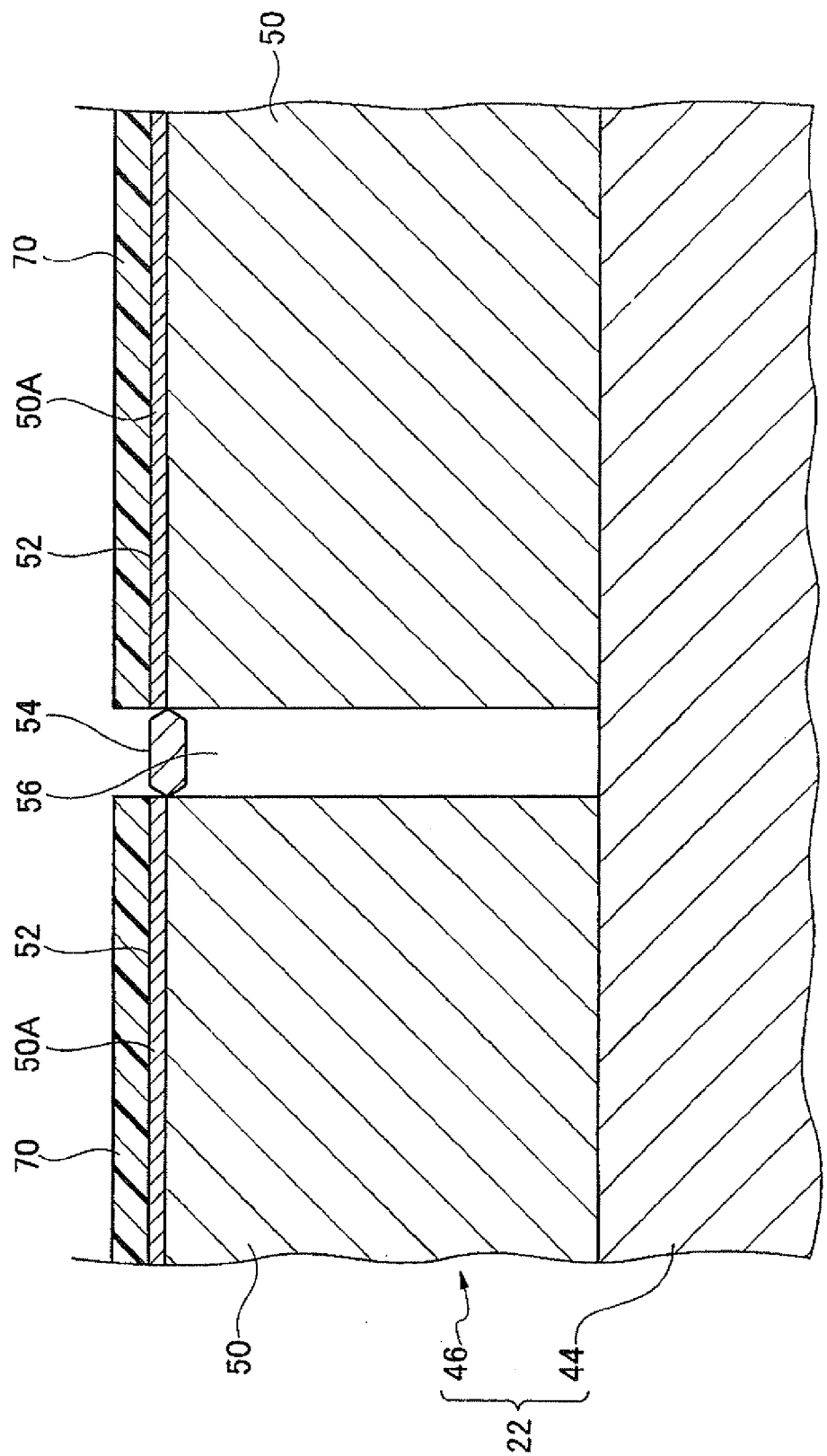
FIG. 8 is a cross-sectional view illustrating a back substrate used in a display medium according to a second exemplary embodiment of the present invention.

As illustrated in FIGS. 8 and 9, a surface treatment 70 for decreasing the difference between the reflectivity of the individual electrodes 50 and the reflectivity of the boundary portion 56 is performed for each of the individual electrodes 50.

Specifically, the surface treatment 70 is black anodization (alumite processing) performed on the electrode surface (the surface) 52 of an aluminum film 50A and the thickness of the surface treatment 70 is in the range of 15 μm to 20 μm.

By performing the surface treatment 70 with respect to the individual electrodes 50, the reflectivity of the individual electrodes 50 is decreased to be approximate to the reflectivity of the boundary portion 56 (the difference in reflectivity is decreased).

As such, the surface treatment 70 is performed with respect to the respective individual electrodes 50 during manufacturing the individual electrodes 50 by performing the surface treatment 70 for each of the individual electrodes 50.

By adopting the anodization (alumite processing) as the surface treatment 70, a peeling strength of the surface treatment 70 for the aluminum film 50A is improved as compared with the plating. Other operations of the second exemplary embodiment are similar to those of the first exemplary embodiment.

Although the specific exemplary embodiments of the present invention have been described in detail, it is apparent to those skilled in the art that the present invention is not limited to the associated exemplary embodiments, but various other exemplary embodiments can be implemented with the scope of the present invention. For example, in the first exemplary embodiment, the coating 60 is black, but the coating 60 may be black by overlapping layers with two other colors (complementary colors).

In the second exemplary embodiment, the anodization is used as the surface treatment 70, but hard chrome plating processing, the hard chrome plating processing and LD processing (anti-corrosion black conductive film coating), or blast processing may be used.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display medium, comprising:
    a first substrate that is transparent to light;
    a second substrate (i) that is provided to be opposite to the first substrate, (ii) that has a plurality of electrode portions and a plurality of boundary portions placed at a predetermined interval, a boundary portion being between electrode portions and (iii) that indicates a relationship satisfying the following equation, $|R_1-R_2| \le 12$ percentage points, wherein $R_1$ presents reflectivity of the electrode portions and $R_2$ presents reflectivity of the boundary portions;
    a spacing member (iv) that is placed between the first substrate and the second substrate at another interval different from the predetermined interval of the electrodes, (v) that is transparent to light, and (vi) that keeps a gap between the first and second substrates; and
    a particle dispersion liquid that is filled between the first and second substrates, and that includes a dispersion medium and particles which moves by an electric field formed between the first and second substrates.

2. The display medium of claim 1, wherein:
    an electrode surface of each electrode portion facing the first substrate side has a coat layer made of an anodized aluminum alloy.

3. A display device, comprising:
    the display medium of claim 1; and
    a field forming unit that forms an electric field between substrates by applying voltage between the substrates provided in the display medium.

4. The display medium of claim 1, wherein the second substrate has a difference between the reflectivity of the electrode portions and the reflectivity of the boundary portions with respect to light incident from the first substrate side, and the difference is evenly throughout the electrode portions and the boundary portions.

5. The display medium of claim 4, wherein the second substrate has a coat layer so as to set the difference to be 12 percentage points or less.

6. The display medium of claim 5, wherein the coat layer is black.

7. A display medium, comprising:
    a first substrate that is transparent to light;
    a second substrate (i) that is provided to be opposite to the first substrate, (ii) that includes a plurality of electrode portions and a plurality of boundary portions placed at a predetermined interval, a boundary portion being between electrode portions and (iii) in which surface treatment is performed on the first substrate side, the surface treatment which decreases a difference between reflectivity of the electrode portions and reflectivity of the boundary portions with respect to light incident from the first substrate side;
    a spacing member (iv) that is placed between the first substrate and the second substrate at another interval different from the predetermined interval of the electrodes, (v) that is transparent to light, and (vi) that keeps a gap between the first and second substrates; and
    a particle dispersion liquid that is filled between the first and second substrates, and that includes particles which moves by an electric field formed between the first and second substrates and a dispersion medium.

8. The display medium of claim 7, wherein:
an electrode surface of each electrode portion facing the first substrate side has a coat layer made of an anodized aluminum alloy.

9. The display medium of claim 7, wherein the surface treatment is performed evenly throughout the electrode portions and the boundary portions.

10. The display medium of claim 9, wherein the surface treatment is coating.

11. The display medium of claim 10, wherein the coating is black.

* * * * *